US012459609B2

(12) United States Patent
Opedal et al.

(10) Patent No.: US 12,459,609 B2
(45) Date of Patent: Nov. 4, 2025

(54) WALK-TO-WORK SYSTEM AND METHOD THEREOF

(71) Applicant: MacGregor Norway AS, Kristiansand S (NO)

(72) Inventors: Jan Arne Opedal, Mjølkeråen (NO); Carl David Herland, Strusshamn (NO)

(73) Assignee: MacGregor Norway AS, Kristiansand S (NO)

( * ) Notice: Subject to any disclaimer, the term of this patent is extended or adjusted under 35 U.S.C. 154(b) by 662 days.

(21) Appl. No.: 17/913,056

(22) PCT Filed: Mar. 22, 2021

(86) PCT No.: PCT/EP2021/057279
§ 371 (c)(1),
(2) Date: Sep. 20, 2022

(87) PCT Pub. No.: WO2021/191152
PCT Pub. Date: Sep. 30, 2021

(65) Prior Publication Data
US 2023/0143998 A1    May 11, 2023

(30) Foreign Application Priority Data

Mar. 24, 2020 (NO) .................................... 20200345

(51) Int. Cl.
*B63B 27/14* (2006.01)
*B66B 9/00* (2006.01)
(Continued)

(52) U.S. Cl.
CPC ................ *B63B 27/14* (2013.01); *B66B 9/00* (2013.01); *B66B 13/12* (2013.01); *B63B 2027/141* (2013.01); *F03D 80/00* (2016.05)

(58) Field of Classification Search
CPC ..... B63B 27/14; B63B 2027/141; B66B 9/00; B66B 13/12; F03D 80/00
See application file for complete search history.

(56) References Cited

U.S. PATENT DOCUMENTS 3,875,603 A * 4/1975 Mampaey ............... E01D 15/24
14/71.3
4,473,916 A    10/1984 Connold
(Continued)

FOREIGN PATENT DOCUMENTS

CN    204507189 U    7/2015
CN    106143809 A    11/2016
(Continued)

OTHER PUBLICATIONS

International Search Report issued in PCT/EP2021/057279 on Jul. 13, 2021 (4 pages).
(Continued)

*Primary Examiner* — Abigail A Risic
(74) *Attorney, Agent, or Firm* — Osha Bergman Watanabe & Burton LLP

(57) ABSTRACT

A walk-to-work system for allowing personnel and/or equipment to move between a vessel and a wind turbine includes a gangway system and an elevator system positioned with a radial offset from the gangway system. The gangway system includes a height adjustable elongated pedestal and a gangway. The height adjustable elongated pedestal has a first elongated pedestal end mountable onto a deck of the vessel. The height adjustable elongated pedestal includes a first pedestal part and a second pedestal part height adjustably coupled to the first pedestal part. The gangway is rotationally coupled to the height adjustable elongated pedestal at a height $H_g$ from the first elongated pedestal end such that the gangway is radially extending at a length $L_g$ from a center axis of the height adjustable elongated pedestal. The elevator
(Continued)

system includes a height adjustable elongated elevator having a first elevator end mountable onto the deck of the vessel. The height adjustable elevator includes a static elevator part and a displaceable elevator part height adjustably coupled to the static elevator part. The elevator system includes a drive system, an elevator car, and a lifting device. The drive system is configured to displace the displaceable elevator part relative to the static elevator part along the elevator's height. The elevator car is movably connected to the height adjustable elevator. The elevator car is configured to be elevated up to the same height as the gangway for allowing access between the elevator system and the gangway system. The lifting device is configured to move the elevator car of the height adjustable elevator.

26 Claims, 9 Drawing Sheets

(51) Int. Cl.
*B66B 13/12* (2006.01)
*F03D 80/00* (2016.01)

(56) References Cited

U.S. PATENT DOCUMENTS

| 2018/0141621 A1* | 5/2018 | Van Aalst | B63B 27/14 |
| 2021/0107599 A1* | 4/2021 | Prins | B63B 27/146 |
| 2025/0108891 A1* | 4/2025 | Ødegård | B63B 27/14 |

FOREIGN PATENT DOCUMENTS

| CN | 207360527 U | 5/2018 |
| CN | 108622322 A | 10/2018 |
| CN | 208683061 U | 4/2019 |
| GB | 2099397 A | 12/1982 |
| KR | 20160142423 A | 12/2016 |
| WO | 2012/069835 A1 | 5/2012 |
| WO | 2017/135821 A1 | 8/2017 |

OTHER PUBLICATIONS

Written Opinion of the International Searching Authority issued in PCT/EP2021/057279 on Jul. 13, 2021 (9 pages).
Norwegian Search Report issued in NO 20200345 mailed on Oct. 27, 2020 (2 pages).
Office Action issued in counterpart Chinese Patent Application No. 202180023399.3 mailed on Jun. 25, 2024 (12 pages).

* cited by examiner

A

B

A

B

A

B

A

B

A

B

WALK-TO-WORK SYSTEM AND METHOD THEREOF

TECHNICAL FIELD

The present invention relates to a walk-to-work system for a waterborne structure such as a vessel, in particular a walk-to-work system for accessing offshore infrastructure such as a bottom-fixed offshore wind turbine.

BACKGROUND AND PRIOR ART

Walk-to-work are used on vessels to transport goods/equipment and personnel between the vessel and offshore wind turbines such as bottom-fixed wind turbines.

Traditional walk-to-work use a combination of movement compensated offshore gangways and elevator shaft, where the elevator shaft has a fixed height and forms an integrated part of the gangway. Alternatively, the gangway may be mounted on a separate pedestal with access to a separate elevator shaft having a fixed height. The elevator is used to move people and goods from various decks on the vessel to a relevant height of the gangway. The gangway is used to support goods and personnel as they move between the vessel and a relevant height of the wind turbine.

As many of the offshore bottom-fixed wind turbines are in areas with large variations between low tide and high tide, the gangway, and in particular the elevator having a fixed height, must be designed for the lowest astronomical tide. This is to ensure that both the gangway and the elevator allow access to a service platform of the wind turbine when the height difference between the sea level and the service platform is at its highest value. Traditionally, this has been solved by simply ensuring that the fixed elevator shaft is sufficiently high.

Examples of prior art solutions using walk-to-work for allowing transfer of personnel and good between a vessel and an offshore wind turbine may be found disclosed in the following patent publications:

U.S. Pat. No. 4,473,916(A) discloses a transfer apparatus provided with a lift to enable access between a water borne vessel and a wind turbine tower. The lift is mountable to the vessel and comprises a platform and a shaft assembly. The platform is driveable along the lift shaft assembly and the lift comprises a motion compensation arrangement arranged to compensate for movement of the vessel relative to the structure. The lift of U.S. Pat. No. 4,473,916(a) has a fixed height and is integrated to the platform and motion compensation arrangement.

CN208683061(U) discloses a tower ladder system for offshore service vessel. The tower ladder system comprises a main frame, a wave compensation boarding device, wave compensation crane device, and an elevator device. The wave compensation boarding gangway device and the wave compensation crane device are mounted outside the main frame and connected to the main frame. The elevator device has a fixed height and is integrated to the main frame.

WO2012069835(A1) discloses a lift to enable access between a waterborne vessel and a structure. The lift is mountable to the vessel and comprises a platform and a lift shaft assembly, where the platform is driveable along the lift shaft assembly. The lift further comprises a motion compensation arrangement arranged to compensate for movement of the vessel relative to the structure. The lift/lift shaft of WO2012069835(A1) has a fixed height and is integrated to the platform.

When the vessel operates against a wind turbine during high tide, the use of such traditional designed walk-to-work, i.e. with an elevator shaft having a fixed height, can lead to undesired shutdowns of the wind turbine since there is a risk of collision between the wind turbine blades and the highest point of the vessel. The highest point will in most cases be the top point of the elevator having a fixed height.

Hence, common for all the above mentioned prior art solutions is a need for a walk-to-work system allowing safe and cost-efficient operations towards different types of wind turbines during all kinds of foreseeable tide conditions, while keeping the frequency of undesired wind turbine shutdowns low. It is thus an object of the present invention to provide a walk-to-work system that allows transfer of personnel and/or goods under any kind of foreseeable tides and/or with low or no risk of collision with the blade of the turbine.

SUMMARY OF THE INVENTION

The present invention is set forth and characterized in the main claims, while the dependent claims describe other characteristics of the invention.

In a first aspect, the invention concerns a walk-to-work system suitable for allowing personnel and/or equipment to move between a first floating marine structure, such as a vessel or other type of marine structure, and a second marine structure, such as a bottom-fixed offshore wind turbine, in particular bottom-fixed wind turbine that have varying height between the lowest point of the wind turbine blade swept area and the sea surface with varying tides, or other type of marine structure.

The walk-to-work system comprises a gangway system comprising a height adjustable elongated pedestal and a gangway. The height adjustable elongated pedestal has a first end mountable onto a deck of the vessel. For example, the pedestal may be mounted on an open deck and/or a closed deck. Additionally, the pedestal may also be integrated to a superstructure of the vessel/marine structure. The height adjustable elongated pedestal comprises a first pedestal part and a second pedestal part height adjustably coupled to the first pedestal part, i.e. the pedestal can be adjusted to various heights.

A gangway is rotationally coupled to the height adjustable elongated pedestal at a height $H_g$ from the first elongated pedestal end such that the gangway is radially extending at a length $L_g$ from a center axis of the height adjustable elongated pedestal. As used herein, "radially extending" means extending in a direction being perpendicular or at least substantially perpendicular to a longitudinal centre axis of the height adjustable elongated pedestal. Thus, the gangway is rotationally mounted on the upper (second) end of the pedestal, such that when the pedestal is height adjusted, the height of the gangway is consequently also adjusted.

The walk-to-work system further comprises an elevator system positioned with a radial offset adjacent to but in a distance from the gangway system, i.e. the elevator system is structurally separated from the gangway and arranged near the gangway such that when an elevator car of the elevator system is elevated to the height of the gangway, the gangway is accessible from the elevator car.

The elevator system comprises a height adjustable elongated elevator, a drive system, an elevator car, and a lifting device.

The height adjustable elongated elevator has a first elevator end mountable onto the decks of the vessel. The height adjustable elevator shaft comprises a static elevator part and a displaceable elevator part height adjustably coupled to the static elevator part for enabling adjusting the elevator to various heights.

The drive system is configured to displace the displaceable elevator part relative to the static elevator part along a longitudinal centre axis of the height adjustable elongated elevator. The drive system may be of any type enabling relative movement between the static elevator part and the displaceable elevator part. For example, the drive system may be a rack and pinion drive or may involve a motorized winch and corresponding set of cables and pulleys, or hydraulic cylinders, or electric actuators.

The elevator car is movably connected to the height adjustable elevator, wherein the elevator car is configured to be elevated up to the same height as the gangway for allowing access between the elevator system and the gangway system.

The lifting device is configured to move the elevator car of the height adjustable elevator. For example, the lifting device may be a motorized winch with corresponding cables, another alternative may involve a rack and pinion lifting device.

In a preferred example embodiment of the walk-to-work system, the static elevator part and the displaceable elevator part are shafts being telescopically connected to each other.

In another preferred example, the first pedestal part and the second pedestal part are telescopically connected to each other.

In another preferred example embodiment, the gangway is rotationally coupled to the second pedestal part, and preferably also fully circumventing the second pedestal having an average diameter Dg and is preferably circular. For example, the gangway may be rotationally coupled to the second pedestal part by a motorized swivel/slewing machinery mounted between the gangway and the second pedestal part. The swivel may be remotely controlled and/or controlled by a control system positioned on the gangway.

In another preferred example embodiment, the gangway system further comprises a bridge connected to an outer radial position of the gangway, for example the outermost radial position of the gangway.

In another preferred example embodiment, the bridge is pivotally connected to the gangway with a rotational axis oriented perpendicular to the height direction of the pedestal.

In another preferred example embodiment, the bridge is configured such that it is length adjustable.

In another preferred example embodiment, the length adjustable bridge comprises two bridge parts telescopically connected to each other, thereby achieving the desired length adjustment through relative displacement.

In another preferred example embodiment, the walk-to-work system further comprises a motion compensation control system allowing motion compensation of the bridge relative to the gangway. Note that the motion compensation control system may also be configured to perform motion compensation control for the height adjustment of the elongated pedestal and/or the elongated elevator and the rotary mechanism/swivel/slewing machinery allowing rotational movement of the gangway.

In another preferred example embodiment, the gangway system further comprises an access platform. Preferably the access platform is arranged adjacent to an outer radial position of the gangway. The term adjacent is defined as a position which allow safe movement of personnel/equipment between the access platform and the gangway.

In another preferred example embodiment, the access platform is supported on the elongated pedestal via a support structure, wherein the access platform is arranged near or at the same height Hg of the gangway. The support structure preferably comprises a collar at least partially circumventing the second pedestal below the gangway and a radially extending framework extending from the collar and to an under side of a base of the access platform. The collar may be rotationally mounted onto the second pedestal or fixed.

In another preferred example embodiment, the gangway system is configured such that the gangway is allowed to rotate independently of the access platform, see for example the above-mentioned configuration with the motorized swivel/slewing machinery.

In another preferred example embodiment, a safety fence is arranged on the access platform, the safety fence being movably connected to a safety barrier of the gangway via a set of tracks such as railings, thereby allowing safe movement of personnel and/or equipment between the access platform and the gangway regardless of the angle of rotation of the gangway. Both the safety barrier and the safety fence have preferably a height that prevents personnel/goods/equipment indented onto the gangway to fall out in allowable weather conditions.

In another preferred example embodiment, the gangway system further comprises an access platform and wherein a landing door is vertically mounted to the access platform, preferably at one side of the access platform distal from the gangway. The landing door are preferably parallel and aligned with the elevator car door when the elevator car is elevated to the height of the access platform.

In another preferred example embodiment, the landing door is configured to interlock against the elevator car. It should be noted that a relative deflection between the elevator car and the gangway is pre-determined so that it is safe to move between the elevator car and the gangway. Thus, the gangway and the elevator car, when elevated to the height of the gangway are separated by an offset allowing safe movement of personnel and equipment there between.

In another preferred example embodiment, the displaceable elevator part is movably connected to the static elevator part via guide rails. Preferably one set of guide rails is mounted on the static elevator part and another of the sets of guide rails is mounted on the displaceable elevator part, wherein the elevator car is movably connected to the guide rails via wheels rotationally mounted on the elevator car such that the elevator is always in contact with at least one set of guide rails.

In another preferred example embodiment, a vessel comprises a hull, a deck, a superstructure arranged on the deck and the walk-to-work system, wherein the walk-to-work system is coupled to the deck, for example an open deck and/or a closed deck of the vessel.

In another preferred example embodiment, the height adjustable elongated elevator is configured such that its minimum height is lower than a highest point of the vessel's superstructure.

In another preferred example embodiment, the height adjustable elongated pedestal is at least partially integrated to the superstructure of the vessel.

In another preferred example embodiment, the vessel comprises a plurality of decks and wherein the static elevator part is fixed to one or more of the plurality of decks of the vessel.

In a second aspect, the invention concerns a method for transferring personnel and/or equipment between a first floating marine structure comprising a walk-to-work system according to the invention as defined in the appended claims, and a second marine structure comprising a service platform, the method comprising the steps of:

A. stabilizing the first floating marine structure relative to the second marine structure,
B. bringing the gangway system in contact with, or in near contact with, for example adjacent to, the service platform by adjusting the height adjustable elongated pedestal to a height that allows access of personnel and/or equipment between the gangway of the height adjustable elongated pedestal and the service platform of the second marine structure,
C. maintaining the contact, or the near contact, by use of a motion compensation control system compensating relative movement between the first marine structure and the second marine structure,
    wherein the motion compensation control system is operationally coupled to at least:
        the pivot point between the gangway and the bridge to ensure motion compensation in the direction around a rotational axis perpendicular to the height direction,
        the mechanism/device controlling the height of the pedestal,
        the mechanism/device controlling the height of the elevator and
        the mechanism/device such as the swivel/slewing machinery controlling the rotation of the gangway around the pedestal,
D. adjusting the height adjustable elongated elevator to a height that allows an elevation of the elevator car up to the same height as the gangway,
E. elevating the elevator car with personnel and/or equipment from an initial position on the elongated elevator to the same height as the gangway, and
F. transferring personnel and/or equipment between the first floating marine structure via the elevator system and the gangway system to the service platform of the second marine structure.

In a preferred example embodiment, the first marine structure is a vessel preferably a vessel as described above.

In another preferred example embodiment, the second marine structure is an offshore wind turbine, such a bottom fixed offshore turbine.

In another preferred example embodiment, step B further comprises bringing the gangway system in contact with, or near contact with, the service platform by use of a length adjustable bridge, wherein one end of the length adjustable bridge is pivotally connected to an outer radial position of the gangway. Hence, the contact, or near contact, is achieved by pivoting the bridge until the bridge's other end is in the desired height position relative to the service platform.

In another preferred example embodiment, step C further comprises
    compensating relative movement between the first floating marine structure and the second marine structure
    by rotating the gangway relative to the height adjustable elongated pedestal, and/or
    by adjusting the height of height adjustable elongated pedestal, and/or
    if the gangway system comprises a length adjustable bridge, by adjusting the length of the length adjustable bridge.

In another preferred example embodiment, the gangway system further comprises an access platform supported on the elongated pedestal such that the access platform is arranged adjacent to an outer radial position of the gangway and wherein step D further comprises adjusting the height of the height adjustable elevator to allow elevation of the elevator car up to the same height $H_g$ as the gangway adjacent to the access platform.

BRIEF DESCRIPTION OF THE DRAWINGS

FIG. 2A shows a side view of the walk-to-work system in a lower (detailed illustration) and upper position (contour illustration) and FIG. 2B shows a perspective view of the walk-to-work system in a lower (detailed illustration) and upper position (contour illustration).

FIG. 3 illustrates in perspective details of a height adjustable elevator forming part of the inventive walk-to-work system, wherein FIG. 3A shows the telescopic elevator in an upper position and FIG. 3B shows the telescopic elevator in a lower position.

FIG. 4 illustrates in profile details of the height adjustable elevator of FIGS. 3A and 3B, where FIG. 4A show the sides of the height adjustable elevator in a lower (detailed illustration) and upper position (contour illustration), while FIGS. 4B and 4C show the height adjustable elevator in a lower (detailed illustration) and upper position (contour illustration), from the front and from the back, respectively.

FIG. 5A shows the walk-to-work system with an access platform having handrails and FIG. 5B shows a top view of the access platform and a gangway of the gangway system rotating independently from the access platform.

FIG. 6A shows the height adjustable elevator of the walk-to-work system in a low elevated position and FIG. 6B shows the walk-to-work system in a high elevated position.

FIG. 7A shows the height adjustable elevator of the walk-to-work system in a low elevated position and FIG. 7B shows the height adjustable elevator in a high elevated position.

FIG. 8A shows the height adjustable elevator of the walk-to-work system in a high elevated position and FIG. 8B shows the height adjustable elevator in a low elevated position.

FIG. 9A shows the height adjustable elevator of the walk-to-work system in an high elevated position and FIG. 9B shows the height adjustable elevator in a low elevated position.

DETAILED DESCRIPTION OF THE INVENTION

In the following, specific example embodiments of the invention will be described in more detail with reference to the drawings. However, the invention is not limited to the example embodiments and illustrations contained herein. It is specifically intended that the invention includes modified forms of the embodiments, including portions of the embodiments and combinations of elements of different embodiments. It should be appreciated that in the development of any actual implementation, as in any engineering or design project, specific decisions must be made to achieve the developer's specific goals, such as compliance with system and/or business-related constraints. Moreover, it should be appreciated that such a development effort might be complex and time consuming, but would nevertheless be a routine undertaking of design, fabrication and manufacture for the skilled person having the benefit of this disclosure.

Figure 1:
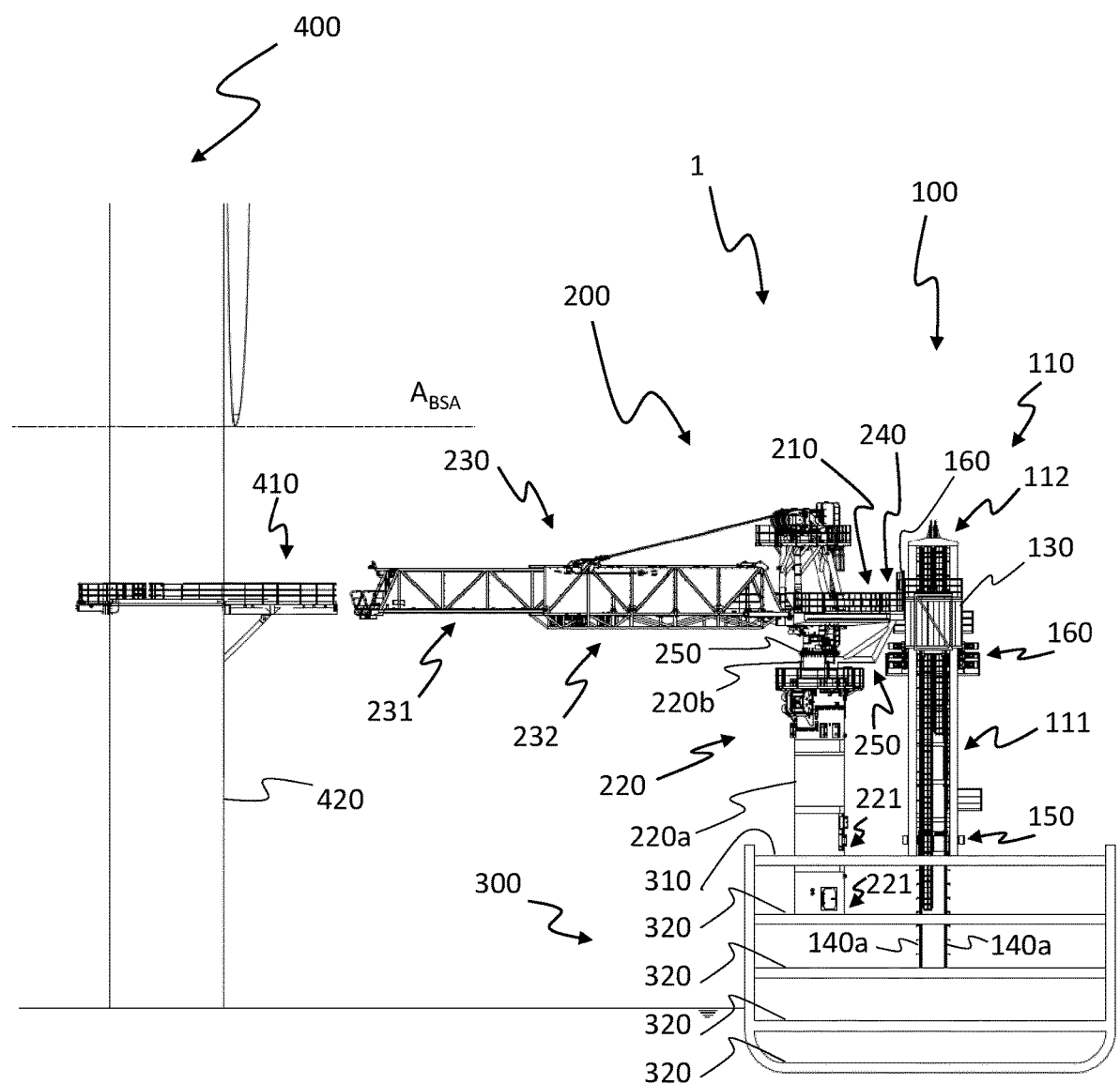
FIG. 1 illustrates schematically a walk-to-work system according to a first example embodiment of the invention mounted in the transversal direction of a waterborne vessel and operating against an offshore wind turbine.

FIG. 1 shows a first example embodiment of a walk-to-work system 1 in accordance with the invention.

In FIG. 1 the walk-to-work system 1 of a first example embodiment of the invention is mounted in a transversal direction of a vessel 300 and allows access between the vessel 300 and a relevant position, for example a service platform 410, of an offshore structure such as an offshore wind turbine installation 400. Thus, when the walk-to-work system 1 is mounted in a transversal direction of the vessel 300 the direction of the access passage between the vessel 300 and a relevant position of the offshore structure is primarily perpendicular or oblique to the vessel longitudinal direction. The walk-to-work system 1 may alternatively be mounted in a different direction on the vessel 300, for example in a longitudinal direction of the vessel, or other directions.

The walk-to-work system 1 comprises a gangway system 200 and an elevator system 100 positioned structurally independently from the gangway system 200.

The gangway system 200 is used to support personnel and/or equipment as they move from the vessel 300 to a particular height of the wind turbine 400, for example at the height of a service platform 410 mounted to the wind turbine tower 420.

The elevator system 100 allows personnel and/or equipment to move from one or more decks, such as opened deck 310 and closed deck 320 from the vessel 300 to the desired height of the gangway system 200, such as the height of a gangway 210 of the gangway system 200.

Having accessed the wind turbine 400, the personnel may carry out tasks such as maintenance, reparation, servicing, or other type of tasks on the wind turbine 400.

The elevator system 100 comprises a height adjustable elevator 110, an elevator car 130 movably connected to the height adjustable elevator 100. As shown on FIG. 1 to 6, the height adjustable elevator 110 may be a telescopic elevator shaft or other type of height adjustable elevators as shown on FIG. 7 to 9.

Figure 2:
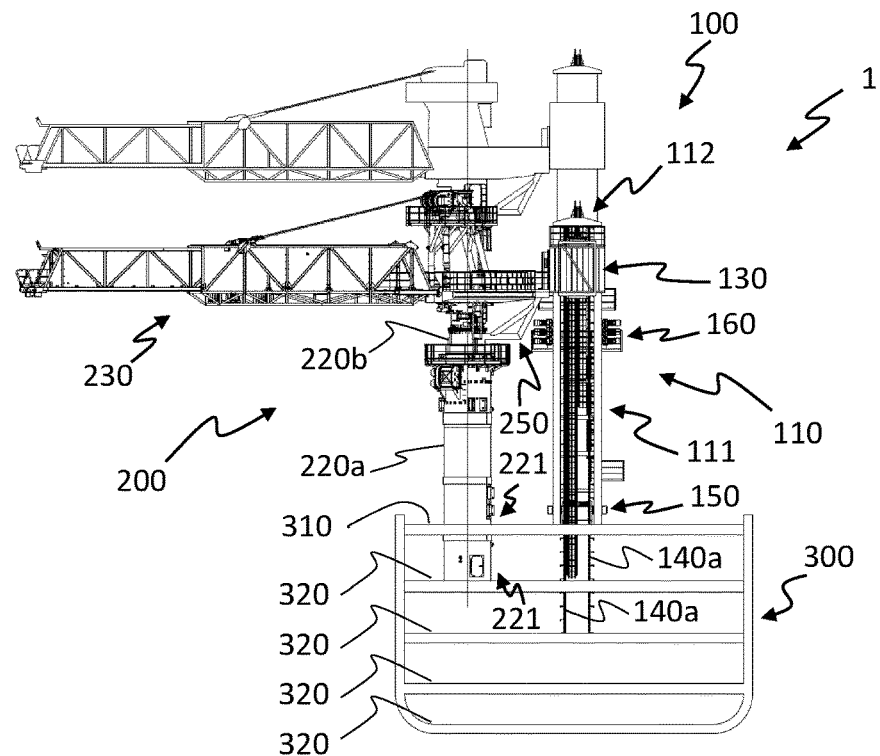
FIG. 2 illustrates schematically the walk-to-work system of FIG. 1 in a lower and upper position, where
Figure 2:
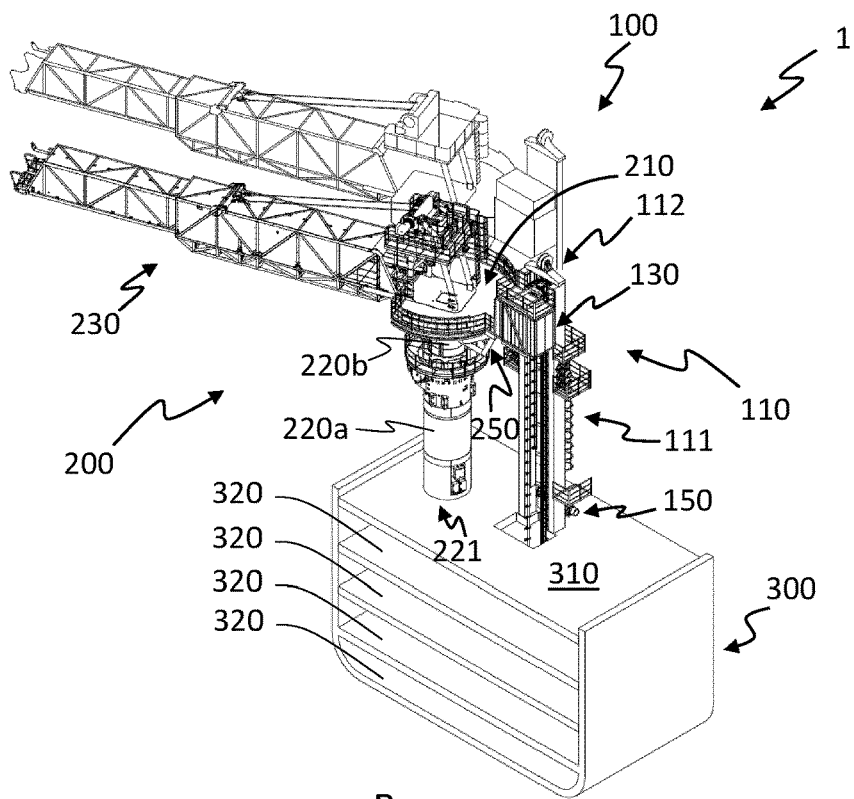

FIG. 2 shows the walk-to-work system 1 of the first example embodiment in two different elevated positions, a retracted/low elevated position shown in continuous back lines, and an extended/high elevated position shown in continuous black lines illustrating only the main contours of the walk-to-work system 1.

The elevator car 130 is configured to be elevated to the same height as the gangway 210 for allowing access between the telescopic elevator shaft 110 and the gangway system 200. The elevator system 100 further comprises a lifting device 150 configured to move the elevator car 130 along the telescopic elevator shaft 110.

Figure 3:
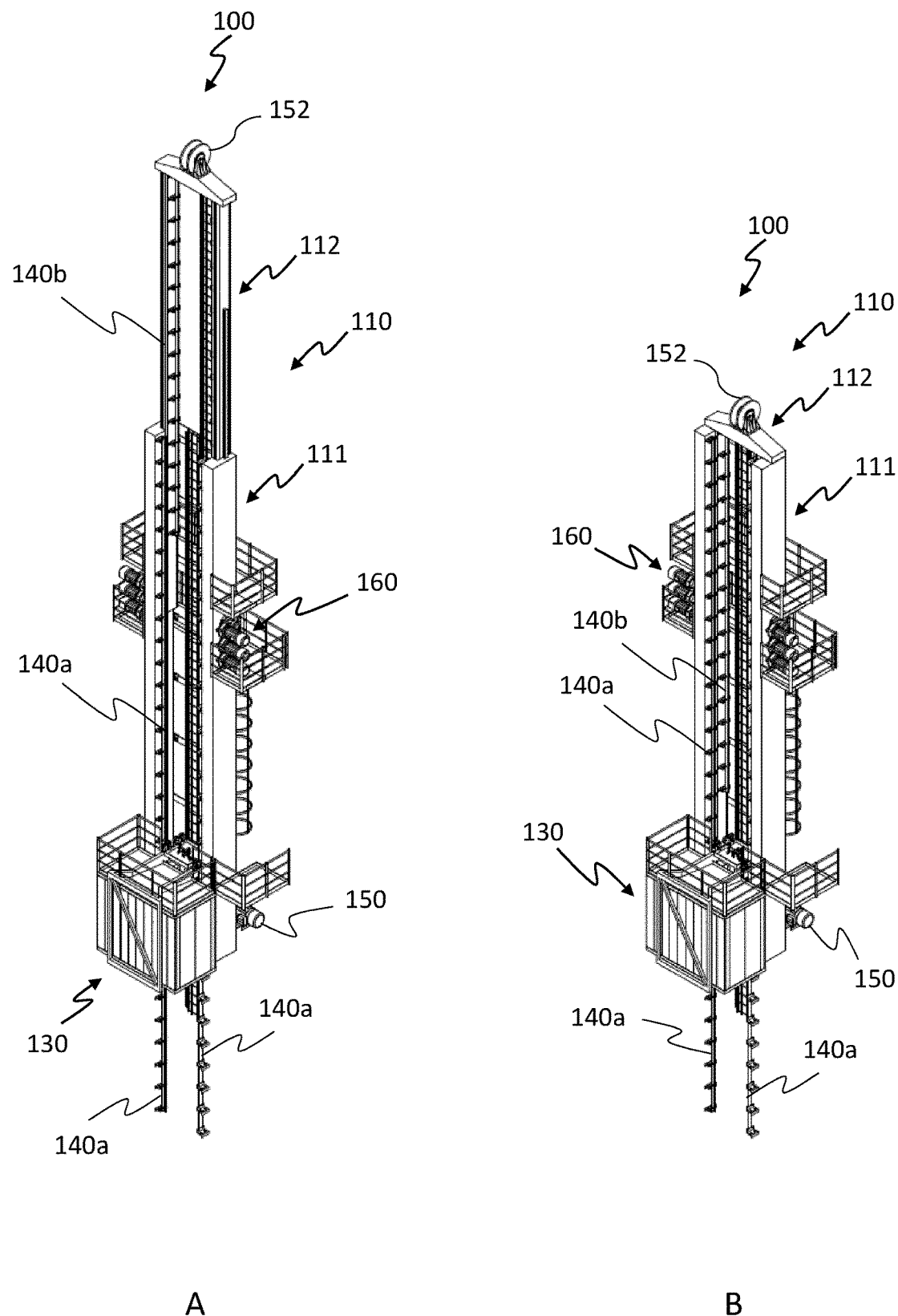

FIG. 3 shows detailed views of the height adjustable elevator 110 of the first example embodiment shown in FIG. 1 when the height adjustable elevator 110 is a telescopic elevator shaft. The telescopic elevator shaft 110, which form part of the inventive walk-to-work system 1, may be a conventional personnel and goods telescopic elevator shaft for offshore use.

The height adjustable elevator 110 comprises a static elevator part 111 that is elongated and mounted onto a deck of the vessel 300 such as an open deck 310 or closed decks 320, a displaceable elevator part 112 that is elongated and height adjustable relative to the static elevator part 111, and an elevator car 130. Thus, the elevator 110 may be elevated to a high position as illustrated in FIG. 3A or to a low position as shown in FIG. 3B.

Figure 4:
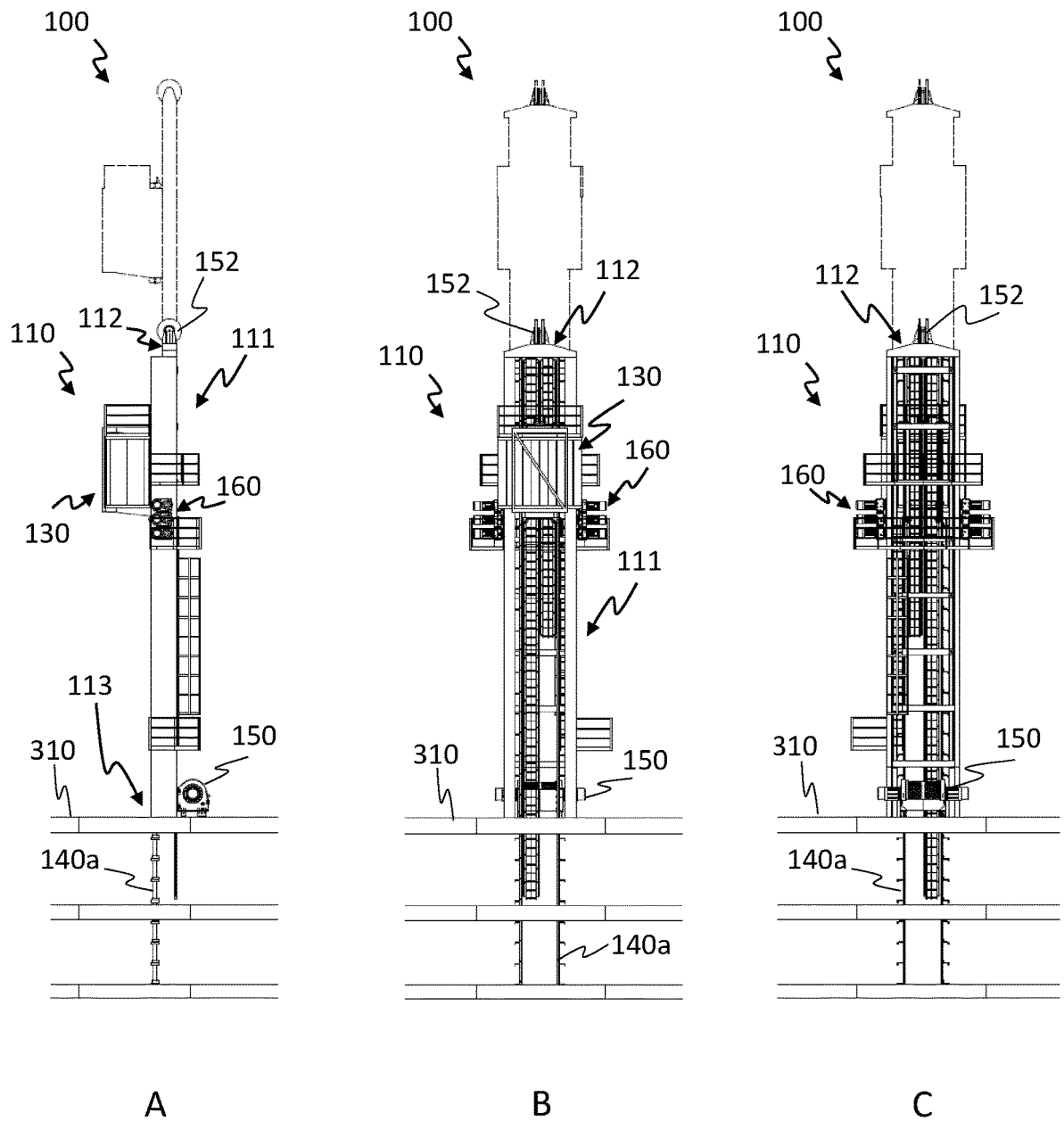

FIG. 4 provides further details side (FIG. 4A) and front (FIGS. 4B and 4C) views of the telescopic elevator shaft 110 of the first example embodiment when the elevator is mounted onto the decks 310, 320 of the vessel 300, wherein the retracted/low elevated position is illustrated in continuous black lines and the extended position is illustrated in black dotted lines. Note, that the illustrations of the extended/high positions only show the main contours of telescopic elevator shaft 110.

The static elevator part 111 is a vertical structure having a pre-determined height. Note that, the term 'vertical' should not be interpreted in a strict mathematical sense, but as substantially vertical, i.e. where deviations from vertical axes are possible, such as deviation between +/−5 degrees. As shown in FIG. 3A and FIG. 3B, the static elevator part 111 may have a rectangular shape. A first elevator end 113 of the height adjustable elevator 110 is securely mounted to the vessel 300, while a second elevator end 114 is located vertically above the first elevator end 113. In principle, the static elevator part 111 may take any forms.

The static elevator part 111 is mounted onto the vessel 300, for example to an open deck 310 as shown in FIG. 1. The static elevator part 111 may be freestanding on the open deck 310 of the vessel 300, as shown in FIG. 1. Alternatively, or in addition, the static elevator part 111 can be completely or partially integrated to a superstructure (not shown) of an open deck 310 of the vessel 300. Alternatively, or in addition, the static elevator part 111 may also be integrated to one or more closed decks 320 of the vessel 300, as shown in FIG. 2.

An advantageous effect of the first example embodiment of having the static elevator part 111 integrated to one or more closed decks 320 and/or into the vessel superstructure, is that it reduces, or eliminate, the elevator's 100 footprint on the open deck 310, thereby leaving more available deck space to the vessel's 300 superstructure.

The static elevator part 111 has a fixed height Hsp that is pre-determined, typically Hsp is about 10 to 25 meters. In general, it should not have a height exceeding the highest point of the vessel superstructure, to minimize the probability that it becomes the reason for any turbine shutdown. A width Wsp of the static elevator part 111 is pre-determined based on space needed for the height adjustable elevator 110 due to the size of the elevator car 130, and the required cross section to carry structural loading. Typically, the footprint of the height adjustable elevator 110 is minimized to ensure maximize available free deck space on vessel.

The static elevator part 111 is preferably made of materials that allows lifting of heavy loads in relevant offshore wind turbine operations. For example, the static part 110 can be made of any type of high strength structural metallic material, preferably weldable structural steel, typically with high strength or extra high strength steel, casted and forged parts may also be used where suitable.

In the particular configuration of the first example embodiment as best illustrated in FIG. 3, the displaceable elevator part 112 is a substantially vertical frame or mast that is movably connected to the static elevator part 111 via sets of double guide rails 140a,140b, where one 140a of the sets of double guide rails is mounted along the static elevator part 111 and another 140b of the sets of double guide rail is vertically mounted on the displaceable elevator part 112. Other means may also be used for movably connecting the displaceable elevator part 112 to the static elevator part 111.

Note that vertical is hereinafter referred to as the direction perpendicular to the sea at rest.

Further, a drive system 160 is in FIGS. 3 and 4 shown connected to the displaceable elevator part 112. The drive system 160 is used to adjust the height of the displaceable part 112 relative to the static elevator part 111. In FIGS. 3 and 4, the drive system 160 is a rack and pinion drive system. However, it may be of any type enabling relative movements between the static elevator part 111 and the displaceable elevator part 120. Other examples may involve a motorized winch and corresponding set of cables and pulleys, or hydraulic cylinders, or electric actuators.

As best illustrated in FIG. 3 and FIG. 4, an elevator car 130 may be movably connected to the sets of double guide rails 140a,140b via for example sets of double wheels 170a,170b mounted to the elevator. The elevator car 130 is configured such that, when the displaceable elevator part 112 is extended relative to static elevator part 111, the elevator car 130 is always in contact with at least one set of guide rails 140a, 140b.

To allow vertical movement of the elevator car 130 along the set of double guide rails 140a,140b, the elevator car 130 is in the first example embodiment operationally connected to a lifting device 150. In FIGS. 3 and 4 the lifting device is shown as a motorized winch with corresponding cables 151 and pulley 152. Another alternative may involve a rack and pinion lifting device.

The displaceable elevator part 112 has a height Htp and a width Wtp that are pre-determined. The height Htp is defined from the height Hsp and the maximum required access height for the particular vessel in question, typically Htp is about 4 m to 20 m. This will however vary from vessel to vessel based on the actual design parameters for the actual wind turbine fields it is intended to operate. The sum of $H_{SP}$ and $H_{TP}$ should give sufficient height to operate the elevator system 100 when gangway system 200 is in upper position. The width Wtp of the displaceable elevator part 112 is pre-determined based on the size of the elevator car 130, and the required cross section to carry structural loading. Typically, the Wtp is minimized to avoid oversizing of static elevator part 111 width Wsp.

The displaceable elevator part 112 may preferably be made of a material that can resists to lift heavy loads and is suitable for offshore use. For example, the displaceable elevator part 112 can be made of any type of high strength structural metallic material, preferably weldable structural steel, typically with high strength or extra high strength steel. Casted and forged parts may also be used where suitable.

An advantageous aspect of the walk-to-work system 1 lies in the elevator system 100 being height adjustable. Reducing the height of the elevator system 100 is advantageous when operating the walk-to-work system 1 against the wind turbine 400 during high tide conditions, while increasing the height of the elevator system 100 is advantageous during low tide conditions.

Particularly, the height adjustable elevator 110 highest point, thereby also the highest point of the elevator system 100, can advantageously be height adjusted to a minimum height $H_{Emin}$, wherein $H_{Emin}$ represents the vertical height between the sea surface, for example at highest astronomical tide conditions, and the highest point of the height adjustable elevator 110. $H_{Emin}$ achieved by the invention is advantageously smaller than that achieved by traditional design from the prior art in similar highest tide conditions, due to the fact the elevator 110 is height adjustable whereas in the prior art the elevator has a fixed height.

Since in most cases the highest point of the height adjustable elevator 110 is also the highest point of the vessel 300, allowing a retraction of the height adjustable elevator to the minimum height $H_{Emin}$ that is smaller than the height achieved in the prior art solutions is an advantage in that it reduces the risk of collision with wind turbine blades in the blade swept area $A_{BSA}$, in particular at highest tide conditions. As a consequence, this particular elevator system 100 contributes to reduce the risk that the wind turbine must be shut down when the vessel 300 operates against the wind turbine. Consequently, it also avoids costs caused by loss in energy production.

Another advantage of the elevator system 100 of the invention is that the elevator car 130 can be elevated at any height along the height adjustable elevator 110. Thus, the elevator car 130 is not limited to be elevated to specific floor levels at specific heights. Thereby, the elevator car 130 can be elevated at any height of the gangway 200 to provide access directly to the gangway 210, or via an access platform 240 if such a platform is used as further described below. This advantageously increases the operational flexibility of the walk-to-work system 1 compare to prior art traditional design.

To allow successful operation of such an elevator system 100, the gangway system 200 is herein made structurally independent of the elevator system 100. This independent configuration effectively reduces, or even removes, limitations of the elevator system 100 design related to the presence of the gangway system 200. For example, a height adjustable such as a telescopic elevator 110 is technically challenging, and even impossible, in a traditional walk-to-work system 1 where the elevator system is a structural integral part of the gangway system 200.

Figure 5:
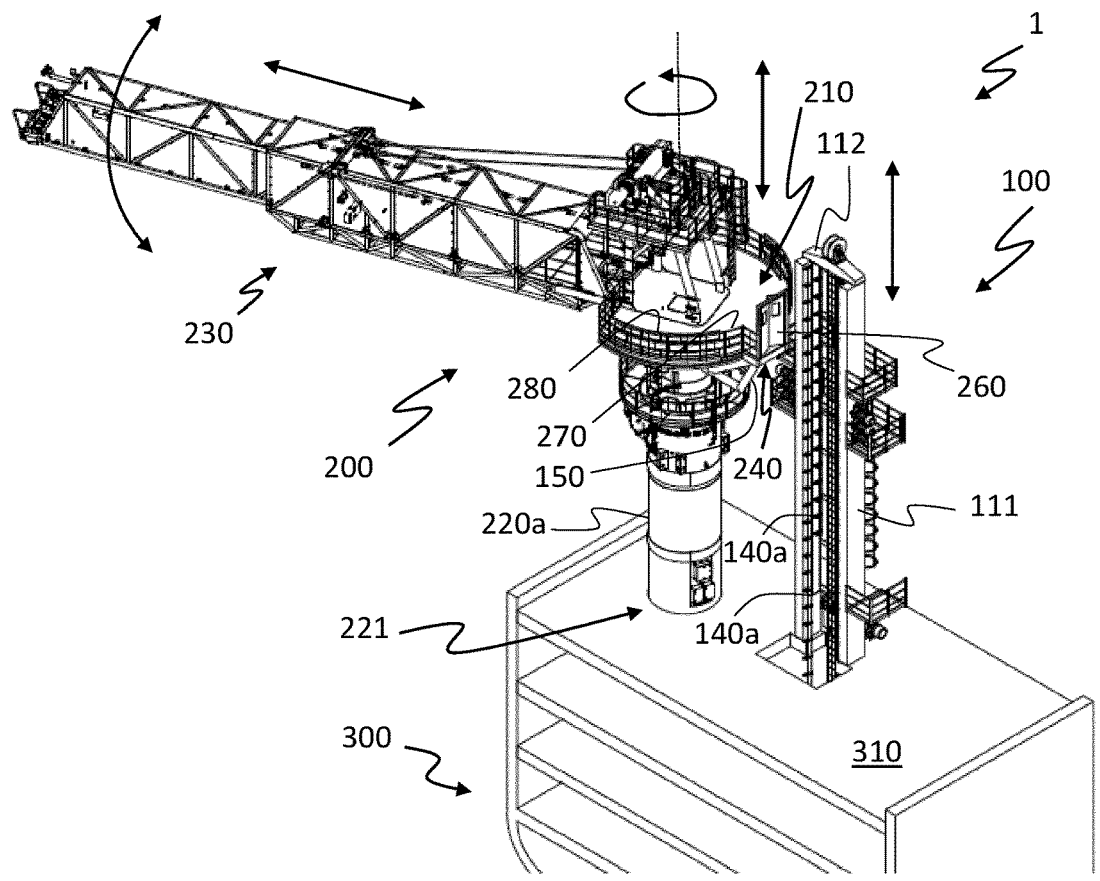
FIG. 5 illustrates a perspective and top view of the walk-to-work system according to the first example embodiment of the invention, where
Figure 5:
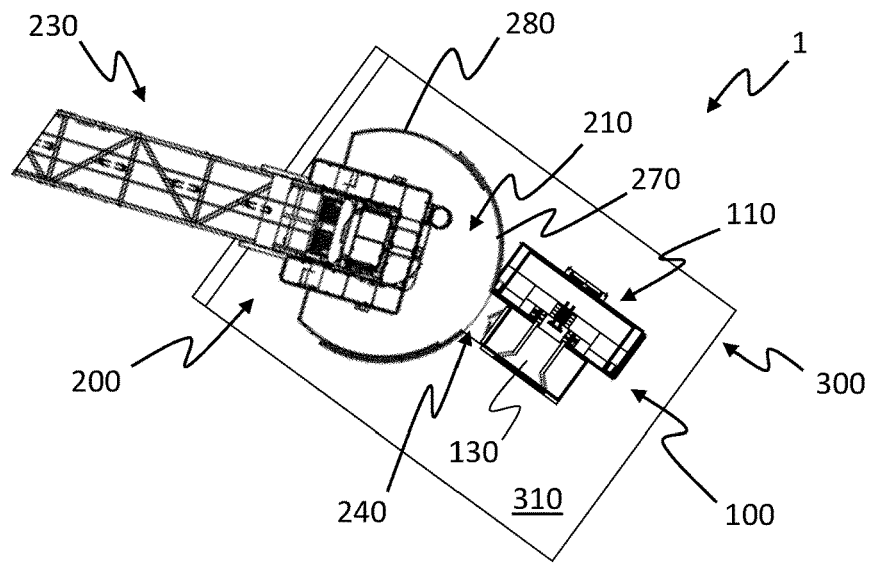

FIG. 5 shows a detailed perspective (FIG. 5A) and top (FIG. 5B) view of the gangway system 200 and elevator system 100 of the first example embodiment. The arrows shown in FIG. 5A illustrated the possible movement of the main elements of the walk-to-walk system 1.

As mentioned above, the gangway system 200 is mounted on the vessel 300 and is structurally independent from the telescopic elevator 100. The gangway system 200 of the first example embodiment may be mounted as a freestanding unit on the open deck 310 and/or as an integrated unit to one or more closed decks 320.

The gangway system 200 comprises a height adjustable elongated pedestal 220 and a gangway 210. The gangway system 200 may be a conventional offshore gangway system. The gangway system 200 may in the first example embodiment further comprise a bridge 230 that may be length adjustable (see arrow on FIG. 5A), such as a telescopic bridge as shown on FIGS. 1,2, and 5-9.

The adjustable elongated pedestal 220 of the first example embodiment has a first pedestal part 220a, shown as an outer pedestal part on FIGS. 1, 2, 5 and 6, and a second pedestal part 220b, shown as an inner pedestal part on FIGS. 1,2,5 and 6. The second pedestal part 220b is typically coupled to the first pedestal part 220a, thereby allowing the second pedestal part 220b to move vertically relative to the first pedestal 220a (see arrow in FIG. 5). One end of the pedestal 220 is fixed to the vessel 300, for example by welding.

The gangway 210 in the first example embodiment is preferably coupled to the second pedestal part 220b, where the coupling is preferably such that the gangway 210 may rotate around a vertical axis (see arrow FIG. 5A), for example via a motorized swivel/slewing machinery. FIG. 5 shows an advantageous example where the gangway 210 is partly circumventing the inner pedestal part 220b.

If the gangway 210 is rotatable, the bridge 230 the first example embodiment may be made rotatable as the bridge is connected to the gangway 210. A rotation of the gangway 210 would thus result in a corresponding rotation of the bridge 230.

Alternatively, the bridge 230 may be rotationally coupled to the second pedestal part 220b such that independent rotations of the gangway 210 and the bridge 230 is achieved.

Figure 6:
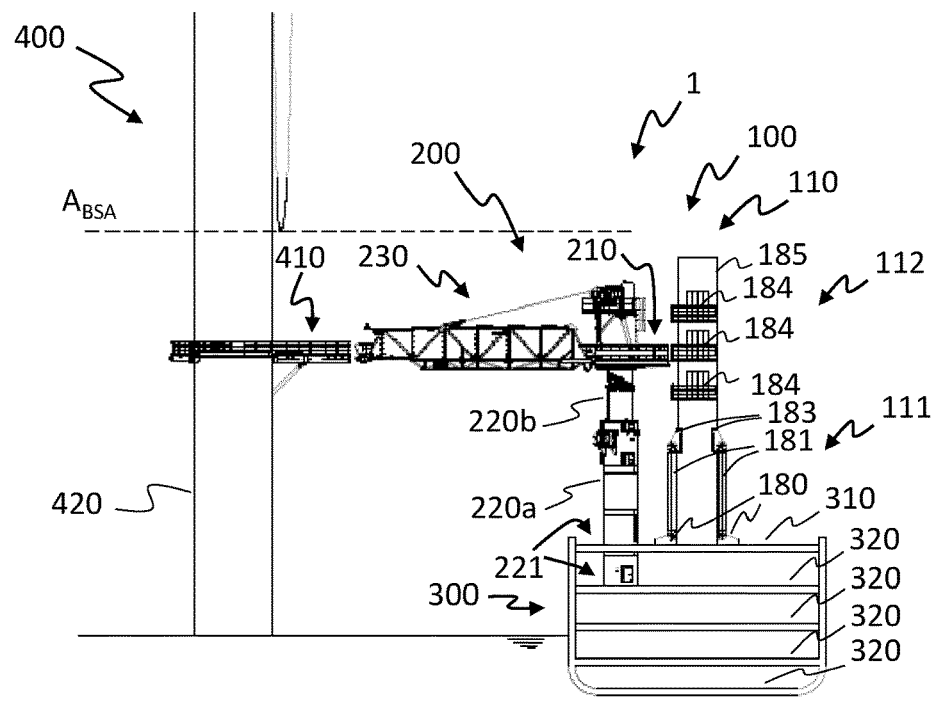
FIG. 6 illustrates schematically a walk-to-work system according to a second example embodiment of the invention mounted in the transversal direction of the vessel and operating against an offshore wind turbine, where
Figure 6:
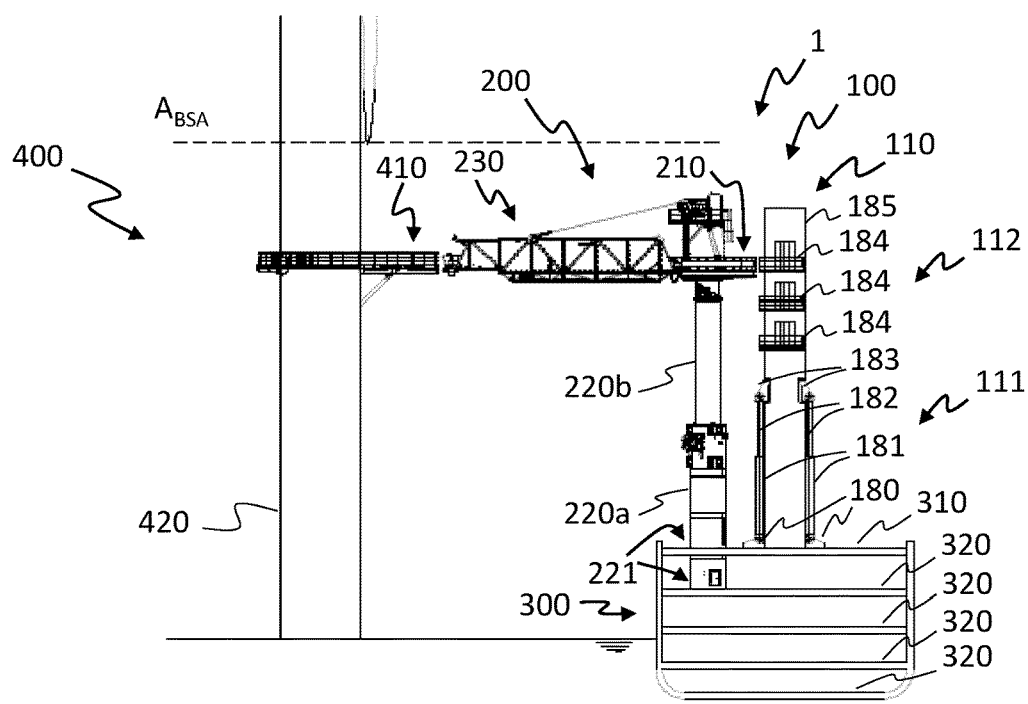

In yet an alternative configuration the first example embodiment, the gangway system 200 may comprise an access platform 240 as depicted FIGS. 2, 5 and 6. The gangway system 200 is configured such that the access platform 240 is arranged on or the near the same vertical level as the gangway 210 but does not rotate with the gangway 210. The access platform 240 and gangway 210 are at the same vertical height and attached to the pedestal 220. Further, the access platform 240 is arranged adjacent to the gangway 210 as best illustrated in FIG. 5B, thereby allowing personnel and/or equipment to safely move between the gangway 210 and access platforms 240.

To allow the gangway 210 in this example embodiment to rotate independently of the access platform 240, the latter may be coupled to the pedestal 220, preferably to the inner pedestal part 220b, using a support structure 250. With particular reference to FIG. 5, such a support structure 250 may comprise a collar 251 at least partly circumventing the inner pedestal part 220b below the gangway 210 and a radially extending framework extending from the collar 251 to an underside of a base of the access platform 240. The collar 251 may be either rotationally mounted onto the inner pedestal part 220b or fixed.

The access platform 240 in this example embodiment may have a rectangular shape as best shown in FIG. 5B. But any shapes allowing the above-mentioned transfer of personnel and/or equipment are feasible.

A landing door or the like 260 may in this example embodiment be vertically mounted to one side of the access platform 240 distal to the gangway 210. The elevator door may be mounted along part of or the entire width of the access platform 240.

To meet intentional safety standard, the landing door 260 in this example embodiment is preferably interlocked against the elevator car door 131 to prevent opening of the doors to the access platform 240 when the landing door 260 and the elevator car door 131 are not vertically aligned according to the applicable elevator safety standard. Typically, a misalignment of more than 20 cm will prevent opening of the doors 260,131, but this may vary depending on the applicable standard. Emergency operation of doors in any position is possible by use of special tools, such as a key.

As shown in FIG. 5B, the landing door 260 in this example embodiment shall be parallel and aligned with a door 131 of the elevator car 130 when the latter has been elevated to the height of the access platform 240, as also shown in FIG. 1 and FIG. 2. This allows personnel and/or equipment to safely access the gangway 210 via the access platform 240.

The access platform 240 in this example embodiment may further comprise a safety fence 270 to ensure the safety movement of personnel and/or equipment between the elevator car 130 and the gangway 210. As best illustrated on FIG. 5B, the safety fences 270 may be movably connected via the set of tracks to a safety barrier 280 of the gangway 210, such that a surface area covered by the gangway 210 and access platform 240 is always safely secured for personnel and/equipment to move onto regardless of the rotational position of the gangway 210 relative to the access platform 240.

Operations of the gangway system 200 and elevator system 100 may in this example embodiment be controlled separately or together by a control system (not shown), for example they may be controlled by separate or combined Programmable Logic Controllers (PLC) or Industrial Computers (IPC).

During normal operation, the elevator car 130 of height adjustable elevator 110 may be interlocked to the gangway 210 via interlocking means such a mechanical interlock, alternatively the elevator is interlocked to the access platform 240 if such a platform is used. This allows a floor of the elevator car 130 and a floor of the gangway 210 to always be at the same elevation above the vessel deck 300 when these are interlocked to each other.

Height adjustment and alignment of the displaceable elevator part 112 and elevator car 130 relative to the gangway 210 may in this example embodiment be achieved by using position encoders arranged on the gangway 210 (or the access platform 240, if used), the displaceable elevator part 112, and/or in the interlock, for example in the PLC or IPC. Optionally, proximity sensors may be used to verify the exact position of the displaceable elevator part 112 and elevator car 130 relative to the gangway 210 (or relative to the access platform 240 if used). Alternatively, any sensors such as laser, LiDAR, mechanical switches, Optical Machine Vision may also be used to ensure alignment between the height adjustment of the displaceable elevator part 112, the height adjustment of the elevator car 130 and the height adjustment of the gangway 210 (and access platform 240, if used). Alternatively, an operator may override the interlock between the elevator car 130 and gangway 210 or access platform 240 and adjust the respective heights independently.

FIG. 6 shows a second example embodiment of the invention that is similar to the first embodiment except for the static elevator part 111 and the displaceable elevator part 112. In the second example embodiment, the static elevator part 111 comprises two first support means 180 stationary mounted at a distance from each other on the open deck 310 of the vessel 300 and two hollow elongated first cylinders 181. The first cylinders 181 are vertically mounted onto the first support means 180.

Further in this second example embodiment, the displaceable elevator part 112 comprises two elongated second cylinders 182. Each second cylinder 182 is height adjustably coupled, i.e. telescopically coupled, to one of the first cylinders 181 at an end distal from the first support means 181. The other end of each second cylinders 182 is connected to a second support 183 means supporting an elongated elevator mast 185.

The elevator car 130 (not shown in FIG. 6) of the second example embodiment is integrated into the housing of elevator shaft 185. The elevator mast 185 may comprise several floors 184 allowing personal and/or equipment to move between the elevator car 130 and the gangway 210 when a predetermined floor 184 is elevated to and aligned with the height of the gangway 210.

The elevator car 130 (not shown) of the second example embodiment is integrated into the housing elevator mast 185 of the displaceable elevator part 112. Thus, the elevator car 130 may be elevated within the elevator mast 185 by a lifting device 150. Alternatively, or in addition, the elevator car may also be elevated by elevating the displaceable elevator part 112 relative to the static elevator part 111, even when the elevator car 130 is stationary relative to the elevator mast 185. With this arrangement, the elevator car may be elevated up to the same height as the gangway 210 to allow access between the elevator system 100 and the gangway system 200.

In the second example embodiment, the displaceable elevator part 112 is height adjusted relative the static elevator 111 by means of a drive system 160 (not shown), for example rack and pinion, lifting winches, hydraulic cylinders or the like.

FIG. 6A shows the height adjustable elevator 110 of the second example embodiment in a retracted/low elevated position, while FIG. 6B shows the height adjustable elevator 110 of the second embodiment in an extended/high elevated position. It should be noted that FIGS. 6A and 6B do not show the situation when a floor of the elevator car 130 is aligned with the gangway 210.

Figure 7:
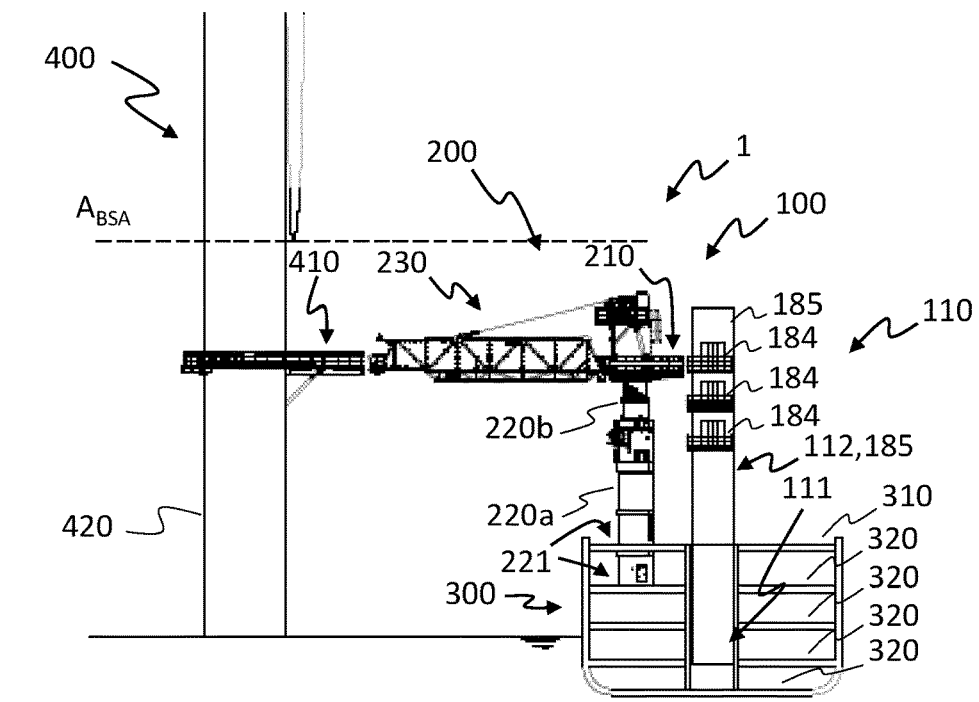
FIG. 7 illustrates schematically a walk-to-work system according to a third example embodiment of the invention mounted in the transversal direction of the vessel and operating against an offshore wind turbine, where
Figure 7:
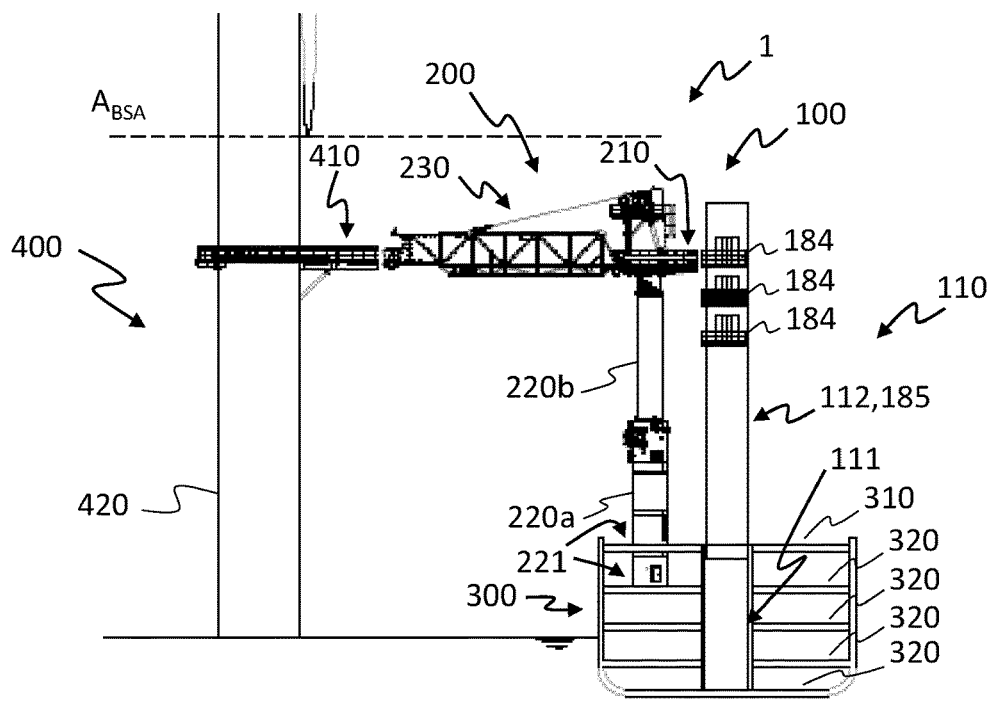

FIG. 7 shows a third example embodiment of the invention that is similar to the first embodiment except for the static elevator part 111 and the displaceable elevator part 112. In the third example embodiment, the static elevator part 111 is a channel extending through the plurality of decks 310,320 of the vessel 300, and the displaceable elevator part 112 is an elongated elevator mast 185 that is height adjustably coupled to the channel through the plurality of decks.

The elevator car 130 (not shown) of the third example embodiment is integrated into the displaceable elevator part 112, i.e. the elongated elevator mast. Thus, the elevator car 130 may be elevated within the displaceable elevator part 112 by means of a lifting device 150 (not shown) or the like. Alternatively, or in addition, the elevator car may also be elevated by elevating the displaceable elevator part 112, i.e. the elevator mast, relative to the static elevator part 111, even if the elevator car 130 is stationary relative to the displaceable elevator part 112. With this arrangement, the elevator car 130 may be elevated up to the same height as the gangway 210 to allow access between the elevator system 100 and the gangway system 200.

The elevator mast may comprise several floors 184 allowing personal and/or equipment may to move between the elevator car 130 and the gangway 210 when a predetermined floor is elevated to and aligned with the height of the gangway 210.

In the second example embodiment the displaceable elevator part 112 is height adjusted relative the static elevator 111 by means of a drive system 160 (not shown), for example rack and pinion, lifting winches, hydraulic cylinders or the like.

FIG. 7A shows the height adjustable elevator 110 of the third example embodiment in a retracted/low elevated position, while FIG. 7B shows the height adjustable elevator 110 of the third embodiment in an extended/high elevated position.

Figure 8:
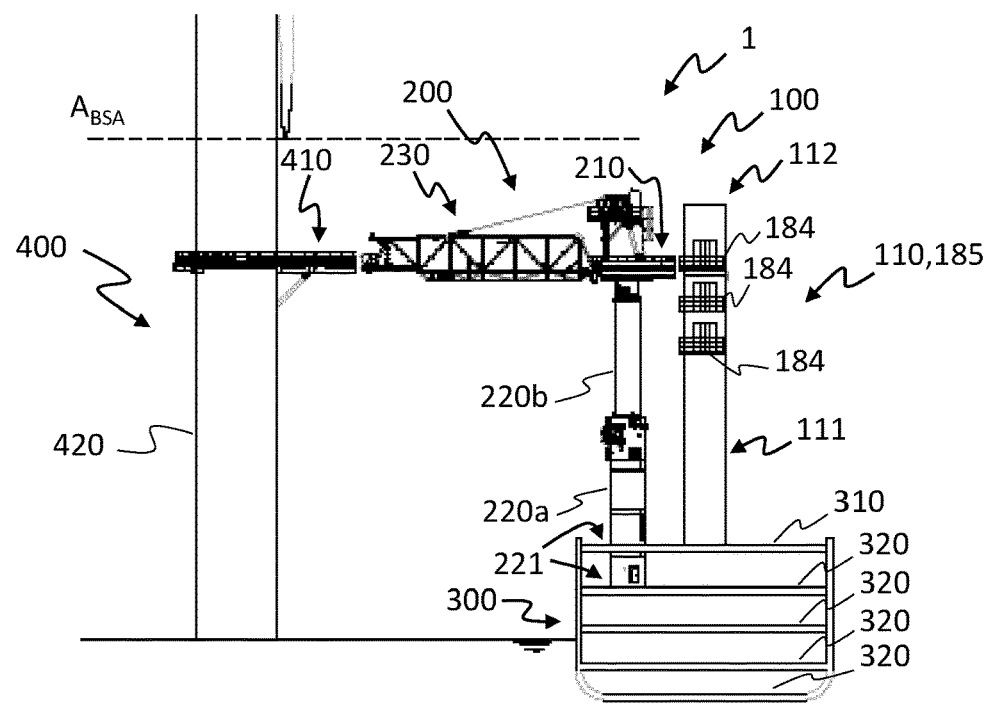
FIG. 8 illustrates schematically a walk-to-work system according to a fourth example embodiment of the invention mounted in a transversal direction of the vessel and operating against an offshore wind turbine, where
Figure 8:
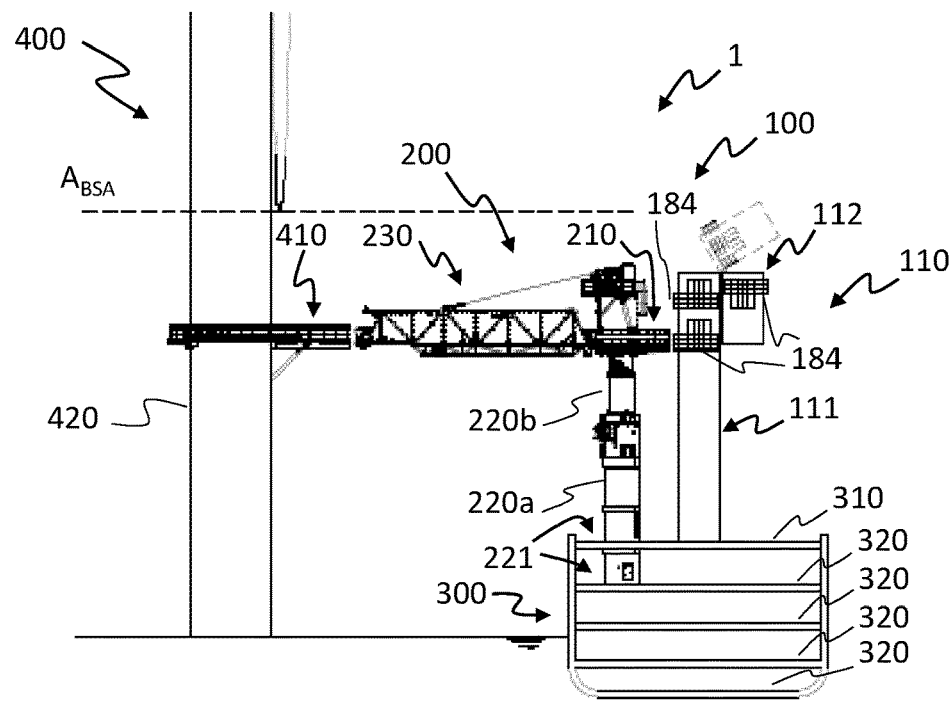

FIG. 8 shows a fourth example embodiment of the invention that is similar to the first embodiment except for the static elevator part 111 and the displaceable elevator part 112.

In the fourth example embodiment, the height adjustable elevator 110 is an elongated elevator mast. The static elevator part 111 is the bottom part of the elevator mast 185 mounted onto the deck 310 of the vessel 300, alternatively or in addition, the static elevator 111 of the fourth example embodiment may be integrated to one or more close decks 320.

Further, the displaceable elevator part 112 of the fourth example embodiment is a top part of said elevator mast 185, wherein the top part is pivotally coupled, and thereby height adjustable, relative to the bottom part of the elevator mast 185. The top part may be pivoted by means of a pivoting system, i.e. a drive system 160. The pivoting system may displace the displaceable elevator part 112 (top part) relative to the static elevator part 111 (bottom part), such that the height of the height adjustable elevator 110 is decreased or pivoted such that the height of the height adjustable elevator 110 is increased. FIG. 8A shows that the top part may pivoted from a high position (shown in dotted lines) on top of the bottom part to a low position (shown in continuous lines) on the side of the bottom part.

The elevator car 130 (not shown) of the fourth example embodiment is integrated into the elevator shaft, i.e. within the bottom and top part of the elongated elevator mast 110,185. Thus, the elevator car 130 may be elevated within the height adjustable elevator 110 by means of the lifting device 150 (not shown) or the like combined with means (not shown) for elevating the elevator car between the bottom and top part of the elevator shaft when the top part is in the high position.

Means for elevating the elevator car 130 between the bottom and top part may involve a set of guide rails (not shown) or the like. One set of guide rails may be arranged on the bottom part and another set of guide rails is arranged on the top part, such the elevator is always in contact with a set of guide rails when moving between the bottom and top part of the elevator mast 185,110. With this arrangement, the elevator car may be elevated up to the same height as the gangway 210 to allow access between the elevator system 100 and the gangway system 200.

The elevator shaft may comprise several floors 184 allowing personal and/or equipment may to move between the elevator car 130 and the gangway 210 when a predetermined floor is elevated to and aligned with the height of the gangway 210.

FIG. 8B shows the height adjustable elevator 110 of the fourth example embodiment in a retracted/low elevated position, while FIG. 8A shows the height adjustable elevator 110 of the fourth embodiment in an extended/high elevated position.

Figure 9:
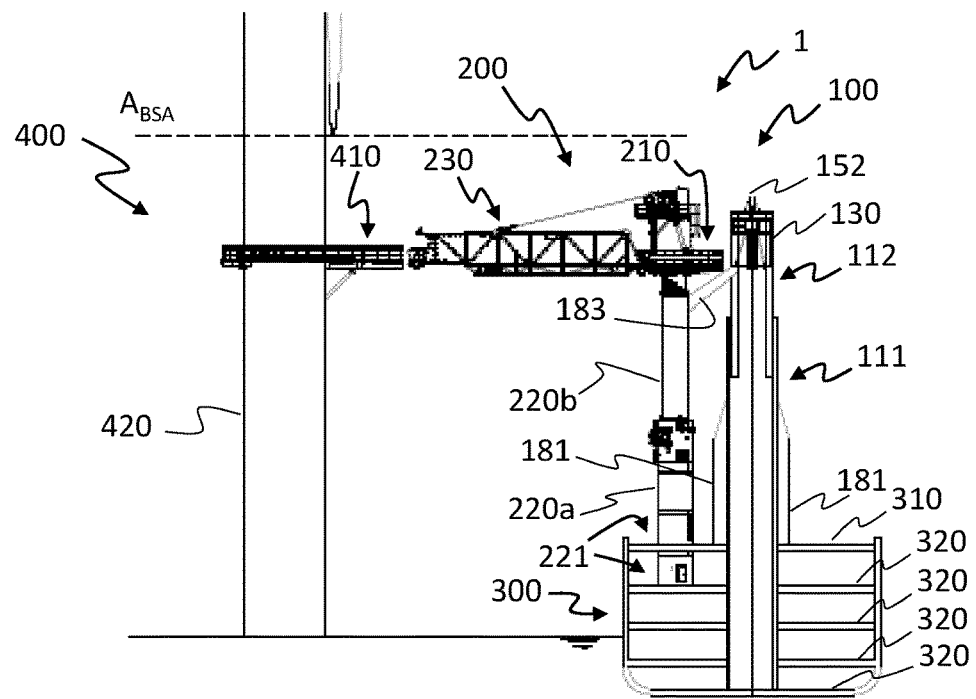
FIG. 9 illustrates schematically a walk-to-work system according to a fifth example embodiment of the invention mounted in the transversal direction of a vessel and operating against an offshore wind turbine, where
Figure 9:
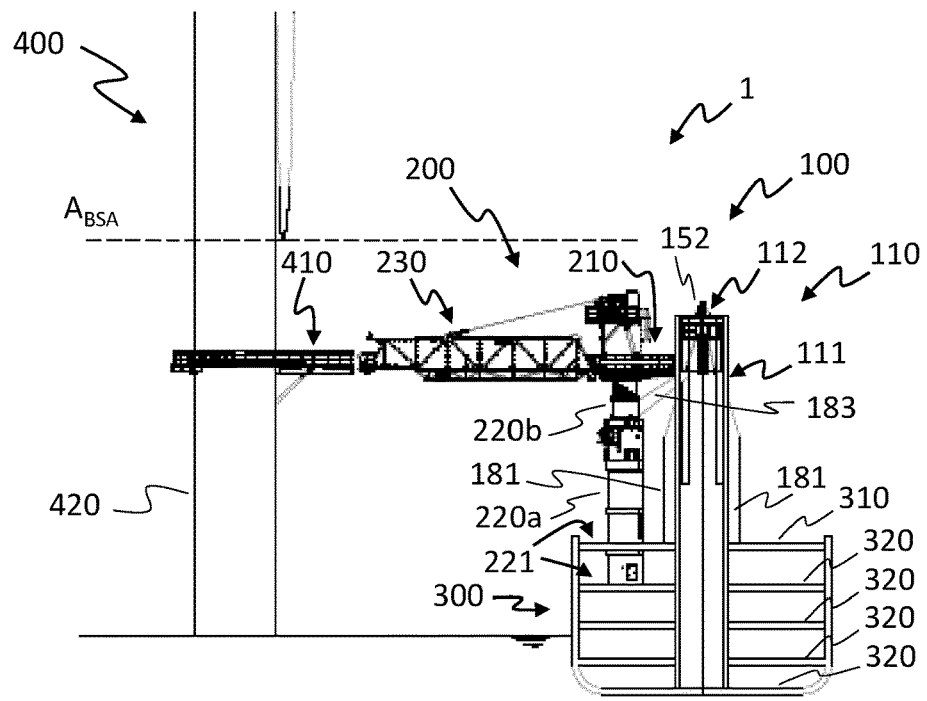

FIG. 9 shows a fifth example embodiment of the invention that is similar to the first embodiment except for the static elevator part 111 and the displaceable elevator part 112. In the fifth example embodiment, the height adjustable elevator comprises a static elevator part 111 and displaceable elevator part 112, where the static elevator part 111 is an elongated channel mounted onto and extending through the plurality of decks 310,320 of the vessel 300 and further protruding vertically from the deck 310 of the vessel 300. The static elevator part 111 further comprises first support means 180 arranged on the vertical sides of the elongated channel to support the structure of the elongated channel. Further in the fourth embodiment, the displaceable elevator part 112 is a framework structure height adjustably coupled to the static elevator 111. As shown in FIG. 8 the displaceable elevator part 112 is telescopically coupled to the static elevator part 111.

A drive system 160 (not shown) of the fourth example embodiment is configured to displace the displaceable elevator part 111, i.e. the framework structure, relative to the static elevator part 111, i.e. the elongated channel. In the fourth embodiment this is achieved by connecting the displaceable elevator part 112 to the second elongated pedestal 220b of the gangway system 200 by a second support means 183 extending from the second pedestal 220b to a position on the displaceable elevator part 111 such that when the height of the second elongated pedestal 220b is adjusted the displaceable elevator part 112 is also adjusted as it is physically connected to the second pedestal 220b.

The elevator car 130 is movably connected to the height adjustable elevator 110 and may be elevated along the height adjustable elevator 110. The elevator car may be movably connected to a sets of guide rails (not shown) via for example sets of double wheels (not shown) rotationally mounted to the elevator. The elevator car 130 may be configured such that, when the displaceable elevator part 112 is extended relative to static elevator part 111, the elevator car 130 is always in contact with at least one set of guide rails.

To allow vertical movement of the elevator car 130 along the height adjustable elevator 110, the elevator car 130 is connected to a lifting device (not shown). The lifting device may be a motorized winch with corresponding cables and pulley. Another alternative may involve a rack and pinion lifting device.

With this arrangement, the elevator car may be elevated up to the same height as the gangway 210, i.e. it may be elevated along the elongated channel and the framework structure, to allow access between the elevator system 100 and the gangway system 200.

FIG. 9A shows the height adjustable elevator 110 of the fifth example embodiment in an extended/high elevated position, while FIG. 9B shows the height adjustable elevator 110 of the fourth example embodiment in a retracted/low elevated position.

As in the first embodiment, the elevator system 100 and gangway 200 of the walk-to-work system 1 of the second, third, fourth and fifth example embodiments may be partially integrated to the vessel 300 superstructure (not shown).

In all example embodiments, the walk-to-work system 1 is shown arranged in the transversal direction of the vessel 300 as shown in FIG. 1, alternatively it may be arranged in the longitudinal direction of the vessel 300 (not shown) or other ways.

It is appreciated that certain features of the invention, which, for clarity, have been described above in the context of separate embodiments, may also be provided in combination in a single embodiment. Conversely, various features of the invention, which, for brevity, have been described in the context of a single embodiment, may also be provided separately or in any suitable sub-combination.

List of reference numerals/letters:

| | |
|---|---|
| 1 | Walk-to-work system |
| 100 | Elevator system |
| 110 | Height adjustable elevator/Telescopic elevator |
| 111 | Static elevator part |
| 112 | Displaceable elevator part |
| 113 | First elevator end |
| 114 | Second elevator end |
| 130 | Elevator car |
| 131 | Elevator car door/lift car door |
| 140a | First set of double guide rails |
| 140b | Second set of double guide rails |
| 150 | Lifting device |
| 151 | Lifting device cable |
| 152 | Lifting device pulley |
| 160 | Drive system |
| 170a | First set of double wheels |
| 170b | Second set of double wheels |
| 180 | First support means |
| 181 | First cylinders |
| 182 | Second cylinders |
| 183 | Second support means |
| 184 | Floors |
| 185 | Elevator mast |
| 200 | Gangway system |
| 210 | Gangway |
| 220 | Height adjustable elongated pedestal |
| 220a | First/outer elongated pedestal part |
| 220b | Second/inner elongated pedestal part |
| 221 | First elongated pedestal end |
| 222 | Second elongated pedestal end |
| 230 | Bridge/Telescopic bridge |
| 231 | First bridge part |
| 232 | Second bridge part |
| 240 | Access platform |
| 250 | Support means/Support structure |
| 251 | Collar |
| 260 | Landing doors |
| 270 | Safety fence |
| 280 | Safety barrier |
| 300 | Vessel/waterborne structure |
| 301 | Hull of the vessel |
| 302 | Superstructure of the vessel |
| 310 | Open deck/Deck 5 |
| 320 | Closed decks/Deck 1, 2, 3 and 4 |
| 400 | Offshore wind turbine/offshore structure |
| 410 | Service platform - of the wind turbine |
| 420 | Tower |
| $A_{BSA}$ | Blade swept area |
| Dg | Diameter of the gangway |
| $H_g$ | Height between the first elongated pedestal end and the gangway |
| $H_{sp}$ | Height of the static elevator part |
| $H_{tp}$ | Height of the displaceable elevator part |
| Lg | Length of the gangway's radius |
| Wsp | Width of the static elevator part |

The invention claimed is:

1. A walk-to-work system for allowing personnel and/or equipment to move between a vessel and a wind turbine, wherein the walk-to-work system comprises:
a gangway system comprising:
a height adjustable elongated pedestal having a first elongated pedestal end mountable onto a deck of the vessel, the height adjustable elongated pedestal comprising: a first pedestal part and a second pedestal part height adjustably coupled to the first pedestal part, and
a gangway rotationally coupled to the height adjustable elongated pedestal at a height $H_g$ from the first elongated pedestal end such that the gangway is radially extending at a length $L_g$ from a center axis of the height adjustable elongated pedestal,
an elevator system positioned with a radial offset from the gangway system, the elevator system comprising:
a height adjustable elongated elevator having a first elevator end mountable onto the deck of the vessel, the height adjustable elevator comprising: a static elevator part and a displaceable elevator part height adjustably coupled to the static elevator part, a drive system configured to displace the displaceable elevator part relative to the static elevator part along the elevator's height, an elevator car movably connected to the height adjustable elevator, wherein the elevator car is configured to be elevated up to the same height as the gangway for allowing access between the elevator system and the gangway system, and a lifting device configured to move the elevator car of the height adjustable elevator.

2. The walk-to-work system according to claim 1, wherein the static elevator part and the displaceable elevator part are shafts being telescopically connected to each other.

3. The walk-to-work system according to claim 1, wherein the first pedestal part and the second pedestal part are telescopically connected to each other.

4. The walk-to-work system according to claim 1, wherein the gangway is rotationally coupled to the second pedestal part.

5. The walk-to-work system according to claim 1, wherein the gangway system further comprises a bridge connected to an outer radial position of the gangway.

6. The walk-to-work system according to claim 5, wherein the bridge is pivotally connected to the gangway with a rotational axis oriented perpendicular to the height direction of the pedestal.

7. The walk-to-work system according to claim 5, wherein the bridge is configured such that its length is adjustable.

8. The walk-to-work system according to claim 7, wherein the length adjustable bridge comprises two bridge parts telescopically connected to each other.

9. The walk-to-work system according to claim 5, wherein the walk to work system further comprises a motion compensation control system allowing motion compensation of the bridge relative to the gangway.

10. The walk-to-work system according to claim 1, wherein the gangway system further comprises an access platform.

11. The walk-to-work system according to claim 10, wherein the access platform is supported on the elongated pedestal via a support structure, wherein the access platform is arranged near or at the same height $H_g$ of the gangway.

12. The walk-to-work system according to claim 10, wherein the gangway system is configured such that the gangway is allowed to rotate independently of the access platform.

13. The walk-to-work system according to claim 10, wherein a safety fence is arranged on the access platform, the safety fence being movably connected to a safety barrier of the gangway via a set of tracks.

14. The walk-to-work system according to claim 1, wherein the gangway system further comprises the access platform and wherein a landing door is vertically mounted to the access platform.

15. The walk-to-work system according to claim 14, wherein the landing door is configured to interlock against the elevator car.

16. The walk-to-work system according to claim 1, wherein the displaceable elevator part is movably connected to the static elevator part via guide rails.

17. A vessel comprising a hull, an open deck, a closed deck, a superstructure arranged on the deck, and a walk-to-work system in accordance with claim 1, wherein the walk-to-work system is coupled to the open deck.

18. The vessel according to claim 17, wherein the height adjustable elongated elevator is configured such that its minimum height is lower than a highest point of the vessel's superstructure.

19. The vessel according claim 17, wherein the height adjustable elongated pedestal is at least partially integrated to the superstructure of the vessel.

20. The vessel according to claim 17, wherein the static elevator part is fixed to an open deck and/or one or more closed decks of the vessel.

21. A method for transferring personnel and/or equipment between a first floating marine structure comprising a walk-to-work system according to claim 1, and a second marine structure comprising a service platform, the method comprising:

A. stabilizing the first floating marine structure relative to the second marine structure, B. bringing the gangway system in contact with, or near contact with, the service platform by adjusting the height adjustable elongated pedestal to a height that allows access of personnel and/or equipment between the gangway of the height adjustable elongated pedestal and the service platform of the second marine structure, C. maintaining the contact, or the near contact, by use of a motion compensation control system compensating relative movement between the first marine structure and the second marine structure, D. adjusting the height adjustable elongated elevator to a height that allows an elevation of the elevator car up to the same height as the gangway, E. elevating the elevator car with personnel and/or equipment from an initial position at the elongated elevator to the same height as the gangway, and F. transferring personnel and/or equipment between the first floating marine structure via the elevator system and the gangway system to the service platform of the second marine structure.

22. The method according to claim 21, wherein the first marine structure is a vessel comprising:

a hull, an open deck, a closed deck, a superstructure arranged on the deck, and the walk-to-work system, wherein the walk-to-work system is coupled to the open deck.

23. The method according to claim 21, wherein the second marine structure is an offshore wind turbine.

24. The method according to claim 21, wherein step B further comprises:

bringing the gangway system in contact with, or near contact with, the service platform by use of a length adjustable bridge, wherein one end of the length adjustable bridge is pivotally connected to an outer radial position of the gangway.

25. The method according to claim 21, wherein step C further comprises:

compensating relative movement between the first floating marine structure and the second marine structure by rotating the gangway relative to the height adjustable elongated pedestal, and/or by adjusting the height of height adjustable elongated pedestal and/or if the gangway system comprises the length adjustable bridge, by adjusting the length of the length adjustable bridge.

26. The method according to claim 21, wherein the gangway system further comprises an access platform supported on the elongated pedestal such that the access platform is arranged adjacent to an outer radial position of the gangway and wherein step D further comprises:
    adjusting the height of the height adjustable elevator to allow elevation of the elevator car up to the same height $H_g$ as the gangway adjacent to the access platform.

* * * * *